Figure 1:
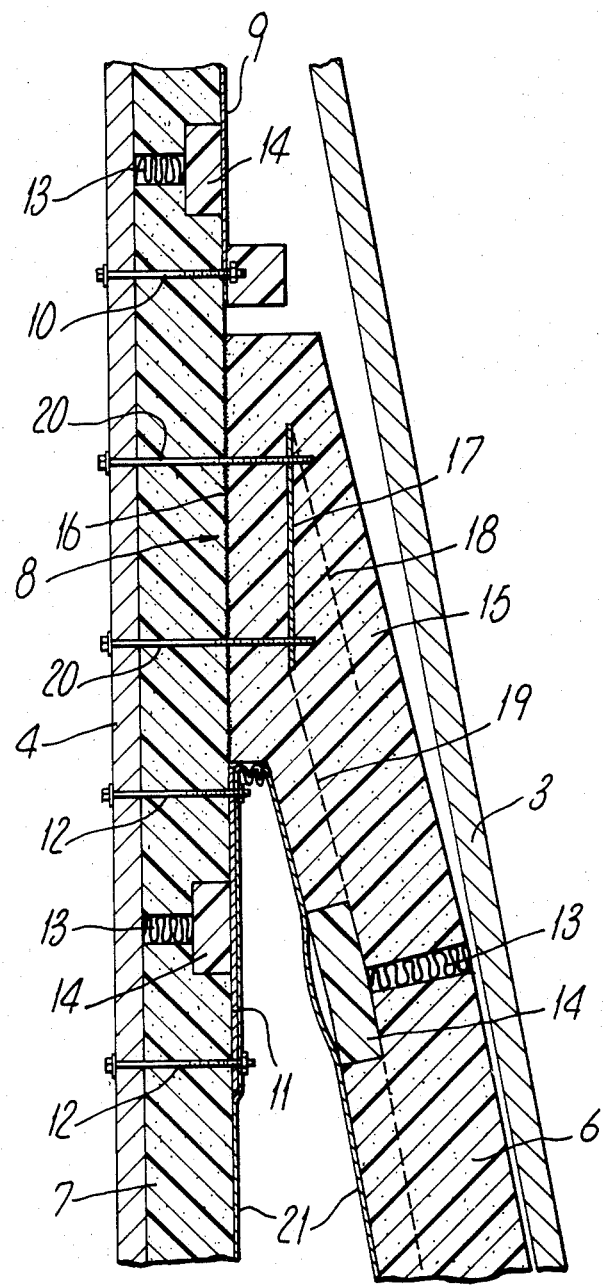

United States Patent [19]

Grondalen

[11] Patent Number: 4,509,657
[45] Date of Patent: Apr. 9, 1985

[54] INSULATION EMBODIMENT IN A WEDGE-SHAPED SPACE BETWEEN TWO STRUCTURAL MEMBERS

[75] Inventor: Svein Gr∅ndalen, Moss, Norway

[73] Assignee: Moss Rosenberg Verft A/S, Moss, Norway

[21] Appl. No.: 422,365

[22] Filed: Sep. 23, 1982

[30] Foreign Application Priority Data

Nov. 4, 1981 [NO] Norway ................................ 813731

[51] Int. Cl.³ ...................... B63B 25/08; B63B 25/16; B65D 8/06
[52] U.S. Cl. .................................. 220/436; 114/74 A; 220/901
[58] Field of Search ..................... 52/573, 309.2, 309.7, 52/309.5, 309.11, 309.12; 220/435, 436, 448, 901; 114/74 R, 74 A; 62/51, 45, 47; 248/146

[56] References Cited

U.S. PATENT DOCUMENTS

| 1,173,893 | 2/1916 | Sutcliffe | 220/70 |
|---|---|---|---|
| 2,181,596 | 11/1939 | Conterman | 248/146 |
| 3,289,370 | 12/1966 | Van Etten | 52/309.11 |
| 3,298,345 | 1/1967 | Pratt | 114/74 A |
| 3,670,917 | 6/1972 | Nishimaki et al. | 220/901 X |
| 3,680,323 | 8/1972 | Bognaes et al. | 114/74 A X |
| 3,753,848 | 8/1973 | Bennett | 220/901 X |
| 3,828,709 | 8/1974 | Bognaes et al. | 114/74 A |
| 3,907,151 | 9/1975 | Gilden | 52/573 X |
| 4,050,609 | 9/1977 | Okamoto et al. | 220/901 X |
| 4,140,073 | 2/1979 | Androulakis | 220/901 X |

FOREIGN PATENT DOCUMENTS 2605353 8/1977 Fed. Rep. of Germany ...... 220/901

Primary Examiner—Stephen Marcus
Assistant Examiner—Robert Petrik
Attorney, Agent, or Firm—Pasquale A. Razzano

[57] ABSTRACT

In an insulated spherical tank for containing liquefied gas, said tank comprising a support in the form of a vertical, partially thermally-insulated skirt which forms a unified structure with the tank wall, wherein the insulation in the wedge-shaped region between the skirt and the spherical tank is sealingly joined, the sealed joint is secured with a mechanical connection.

8 Claims, 5 Drawing Figures

INSULATION EMBODIMENT IN A WEDGE-SHAPED SPACE BETWEEN TWO STRUCTURAL MEMBERS

The invention relates to an insulation embodiment in a wedge-shaped space between two structural members which move in relation to each other as a function of temperature, adjacent surfaces of the insulation on the two members being adhered together.

The invention has been especially developed in connection with insulation problems which have arisen in the transition area between the skirt insulation and the tank insulation on spherical tank carriers equipped with spherical tanks of the type known internationally as the Moss-Rosenberg Spherical Tank System. The basic concept of this spherical tank system is the utilization of a spherical tank which is supported by a vertical skirt extending from the equator of the tank down to a foundation. Such spherical tanks with associated skirt supports are utilized in particular on board vessels intended for transporting LNG and LPG. Such spherical tank structures have proved to be very well suited for this purpose in practice, and excel also because they are simple to calculate accurately. Suitable insulation is provided on the exterior of the spherical tank, and insulation also extends a distance down along the inside and outside surfaces of the skirt. Where the inside insulation on the skirt adjoins the insulation on the lower half of the spherical tank, the adjacent surfaces of the insulation on the skirt and tank wall are adhered together. The most common solution heretofore has been to glue the insulation panels to the skirt in the wedge region and to fasten plywood plates to the outside of this insulation, the plywood plates being secured to the skirt by means of bolts. The uppermost insulation panels on the lower half of the spherical tank are then glued to the plywood plates. The object of adhering the members together in this way is to obtain a sealed connection in the wedge region, to prevent "cold slide" from the wedge region down to the foundation.

Experience has shown that on some of the LNG ships which are built in accordance with the Moss-Rosenberg concept, cracks have occured in the joint between the skirt and the spherical tank insulation. Such cracks permit cold atmosphere from the wedge space to flow down into the underlying space. This results in an increase of the boil-off from the spherical tank and in low temperature in the space beneath the spherical tank. Nitrogen is circulated between the spherical tank insulation and the tank wall as part of the necessary safety precautions for discovering possible leaks of the tank contents, and on ships in operation it has been observed that cold nitrogen from the wedge space has seeped out and lowers the temperature of the foundation deck.

The crack damage which has been observed comprises cracks along the glue seam between the plywood plates and the adjacent spherical tank insulation, and cracks have also been found in the insulation itself, near the glue seam. Bulges or dents have also been found in the plywood plates, so that leaks between these sheets and the skirt insulation could possibly also occur. This in turn introduced tensions in the insulation which is adhered to the plywood.

Investigations into the possible cause of such crack formations have not provided clear answers. The only thing we have been able to determine with some degree of certainty is that the only load state which causes high strains at the joint are strains resulting from a substantial difference in the coefficient of expansion of the insulation and plywood, respectively. The insulation utilized at present is polystyrene. It has been found that when subjected to cooling (delta $T = 180°$ C.), the insulation material contracts significantly (about 13 mm per meter if the insulation lies free), whereas the plywood contracts very little (0.9 mm per meter).

Although modern spherical tanks have a diameter of 30 meters or more, with a corresponding diameter for the cylinder formed by the skirt, space is nevertheless quite limited in the wedge space between the skirt and the lower half of the spherical tank, and this is the reason that the above-described insulation embodiment has been chosen in the wedge-shaped space.

On the basis of what we know today about the cause of the cracks, it has been found that the best solution to the problem, in accordance with the invention, is to strengthen the glue bond with a mechanical connection. One obvious alternate solution would be to replace the plywood plates with a material which is better suited to the insulation material, but it has proved difficult to find a substitute material which has good bond strength to the adhesive and which retains good mechanical properties at the low temperatures to which it will be subjected.

Figure 2:
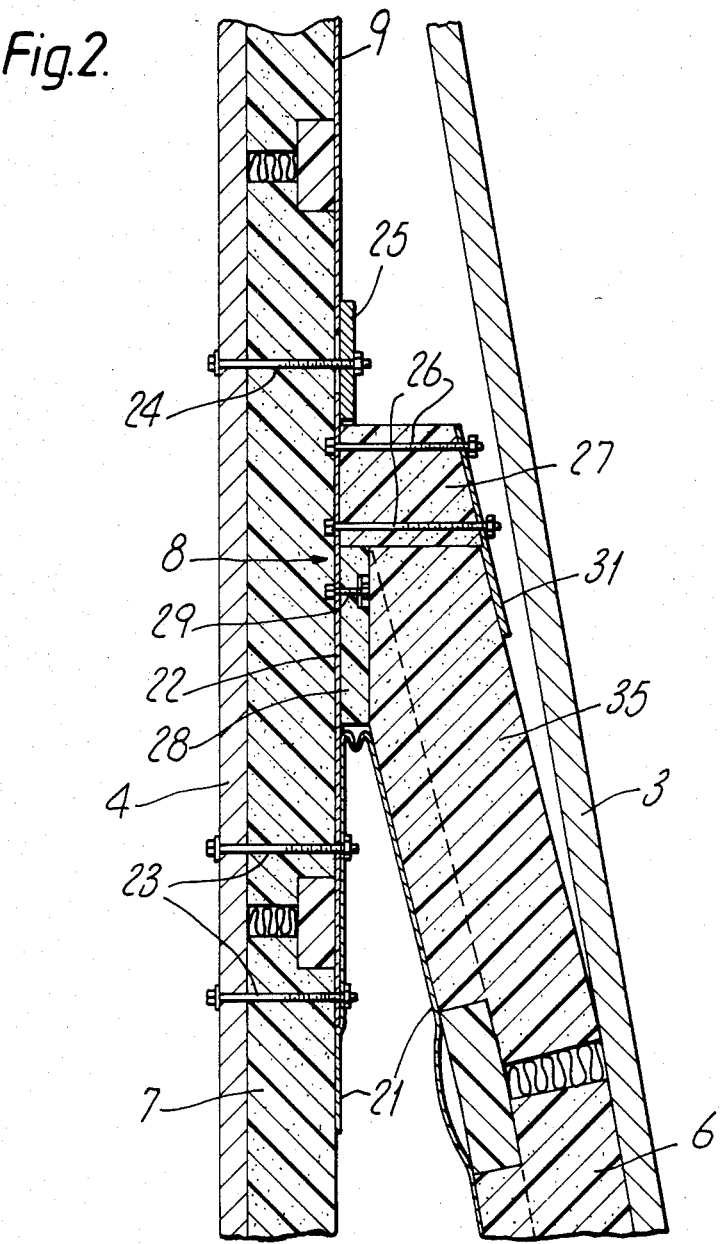
Figure 3:
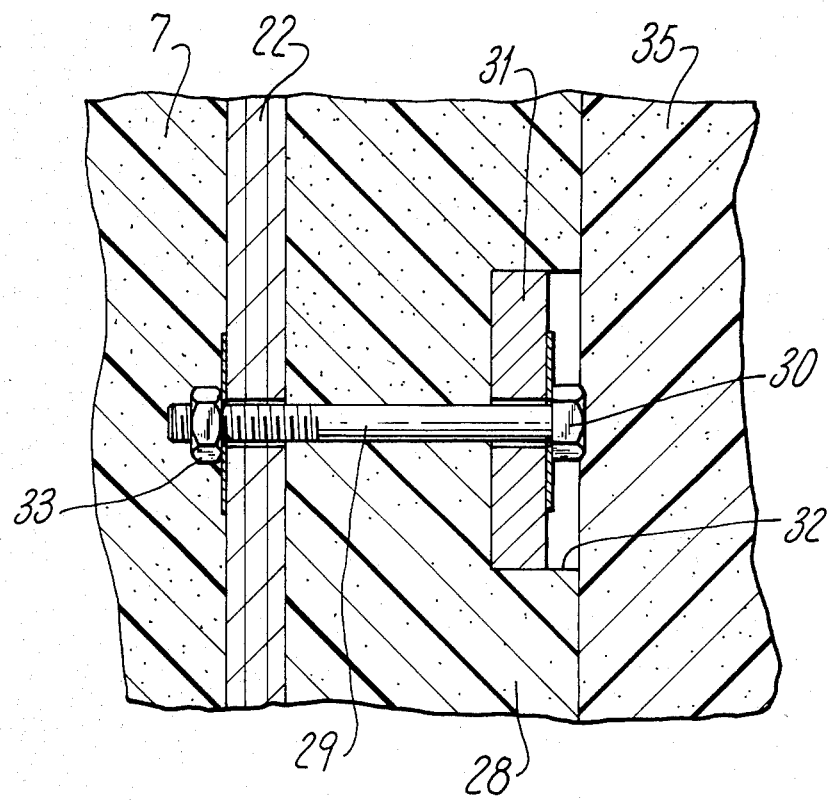
Figure 4:
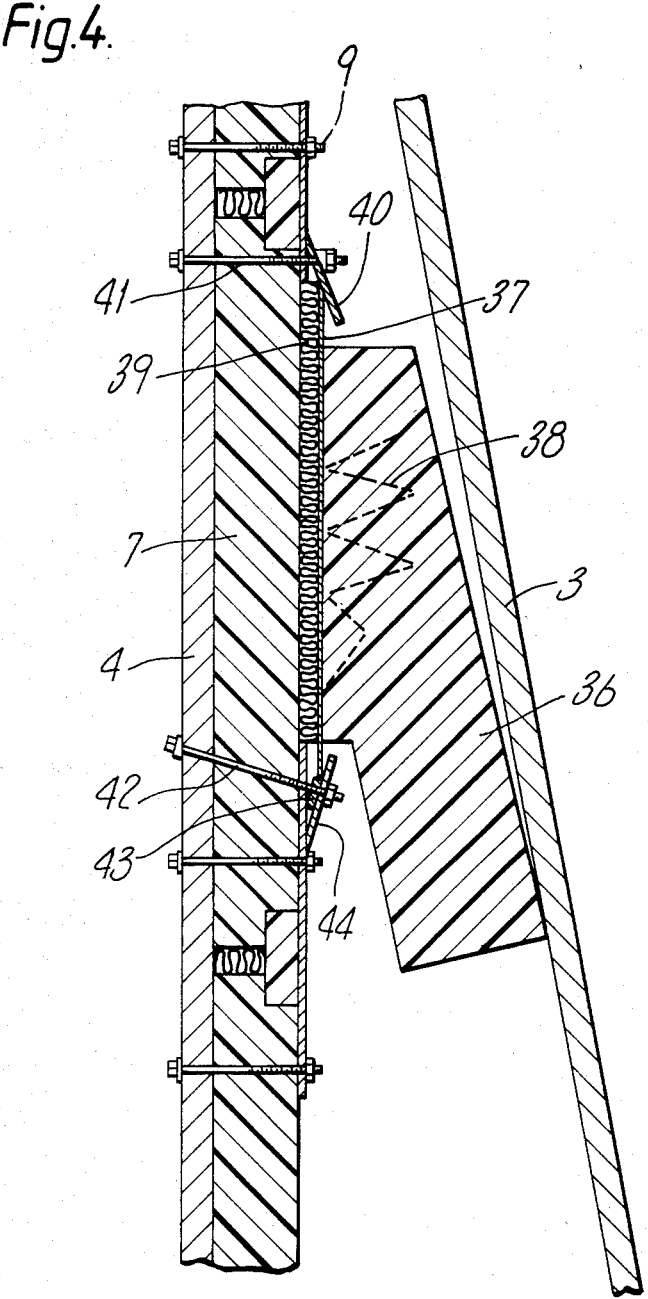
Figure 5:
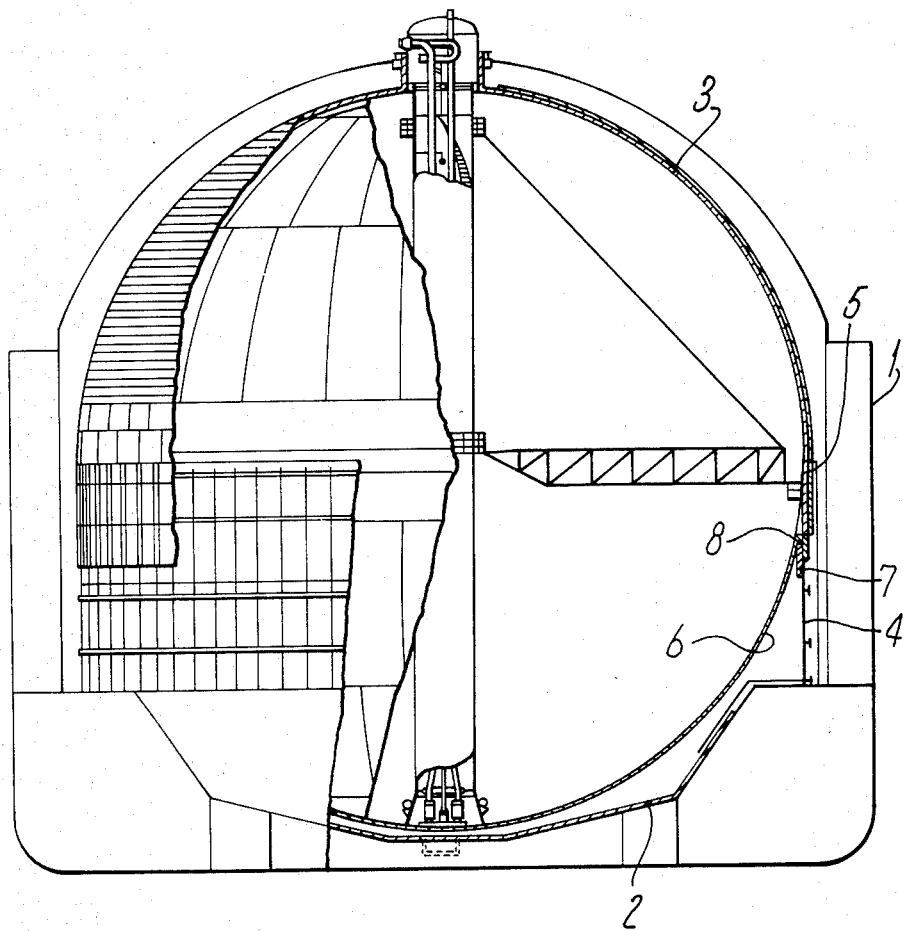

Although the invention has come about as a result of the recognized need for improving the transition between the insulation members in the wedge-shaped space between the spherical tank and its supporting skirt, the invention is not limited to this special utilization. In general, therefore, the invention relates to an insulation embodiment in a wedge-shaped space between two structural members which move in relation to each other as a function of temperature, wherein the insulation on the two members is adhered together on adjacent surfaces thereof, and the insulation embodiment of the invention is characterized in that the adhesive bond is strengthened by a mechanical connection. More particularly, the invention relates to an arrangement on an insulated tank for containing liquefied gas, said tank comprising a support in the form of a vertical, partially thermally-insulated skirt which forms a unified structure with the tank wall, and specifically, the invention relates to an embodiment of insulation in the wedge-shaped region between a spherical tank and its supporting skirt, wherein the insulation on the inside surface of the skirt meets and is adhered to the insulation on the lower half of the spherical tank. Strengthening the adhesive bond with a mechanical connection, in accordance with the invention, can be done in several ways, and in the following some embodiment examples will be described in further detail with reference to the accompanying drawings, wherein:

FIG. 1 shows the transition region between the skirt and spherical tank in cross section, with a first solution, FIG. 2 shows a cross section of the same region with a second solution to the transition problem, FIG. 3 shows a detail, in cross section, along the line III—III in FIG. 2, FIG. 4 shows a third possible solution for the interface between the two insulations in the wedge region between a skirt and a spherical tank wall, and FIG. 5 is a schematic cross sectional drawing of a ship with a skirt-supported spherical tank.

In FIG. 5, the ship is designated by numeral 1 and its double bottom by numeral 2. A spherical tank 3 is supported on the double bottom 2 of the ship by means of a vertical skirt 4 which extends from the equator region 5 of the tank down to the double bottom 2. The skirt 4 is insulated on the inside and outside surfaces thereof a distance downwardly of the equator region 5, where the skirt is secured to the spherical tank, and the inside insulation of the skirt is designated by numeral 7. The external tank insulation on the lower half of the spherical tank is designated by numeral 6. The respective insulations abut at 8, in the wedge-shaped space formed between half of the spherical tank and the skirt.

FIG. 1 shows a portion of the wedge-shaped region, where the skirt is designated by numeral 4 and the spherical tank wall by 3. The insulation on the inside surface of the skirt 4 is indicated by numeral 7, and the insulation on the exterior of the lower half of the spherical tank is indicated by numeral 6, the same numerals as in FIG. 5.

Above the interface region 8 between the respective insulation members, the skirt insulation 7 is secured in position by means of a plywood plate 9, which by means of bolts 10 is screwed to the skirt 4. Similarly, the insulation 7 is held in place below the interface region 8 by means of plywood plates 11 which are screwed to the skirt by means of bolts 12.

Both the skirt insulation 7 and the spherical tank insulation 6 consist of panels of polystyrene, and mineral wood 13 is placed in the seams between the respective panels and covered with elasticized polystyrene 14.

The upper panels 15, which forms the terminal spherical tank insulation in the wedge region, are as shown in FIG. 1 given a special configuration and are formed with a surface of contact 16 intended for interface as shown with the skirt insulation 7 in the joint region 8. In the upper insulation panel 15 for the spherical tank shown in FIG. 1, a plate member 17 has been embedded therein. As indicated in the drawing, the plate member 17 is strengthened by means of glass fiber reinforcement, 18, 19 embedded inside the insulation.

For providing the desired sealed connection between the spherical tank insulation 6, 15 and the skirt insulation 7 in the interface region 8, adhesive is applied in the interface region 8, and lag screws 20 are screwed in from the exterior of the skirt 4, passing through the skirt, the skirt insulation 7 into the insulation 15 and extending into the plate member 17 embedded inside the insulation. The screws are then tightened, which facilitates a good adhesive connection in the interface region 8.

In FIG. 1, aluminum foil 21 covers the facing inner surfaces of the respective insulation members. In the embodiment example illustrated in FIG. 2, the same reference numerals as in FIG. 1 are used to designate like or similar components.

This embodiment differs from FIG. 1 in that below the upper plywood plate 9, a plywood plate 22 is placed which extends down through the interface region 8 and is secured to the tank skirt by means of bolts 23, which correspond to the bolts 12 in the embodiment of FIG. 1, and in addition the plywood plate is secured at the top by means of bolts 24 which are screwed together with a bracket 25 which clamps over the upper plywood plate 9 and the lower plywood plate 22 and holds there plates in position. An upper insulation block 27 is secured to the plate 22 by means of bolts 26, and the insulation block is also glued to the plate 22. Below the upper insulation block 27, a lower insulation block 28 is placed which also is glued to the plate 22 and additionally secured by means of bolts 29. The bolt fastening may be seen in greater detail in FIG. 3; the head 30 of the bolt 29 lies against a contact rail 31 in a groove 32 inside the block 28. The bolt 29 is fastened with a nut 33 to the plywood plate 22.

On the upper insulation block 27, as shown, a plywood plate 34 is secured with bolts 26, and the plate 34 is in addition also glued to the block 27. This plate 34 constitutes a support plate, and the plate 34, together with the blocks 27 and 28, define a space into which the upper insulation panel 35 on the spherical tank is wedged into position, with glue joints between the panel 35 and the two insulation blocks 28 and 27. The space between the insulation blocks 28, 27 and the support plate 34 has a wedge-shaped cross section, and thus provides the desired mechanical reinforcement for strengthening the glue bond when the panel member 35 is pushed up into place.

Between the support plate 34 and the upper insulation block 27, glass fiber sheets (not shown) are suitably placed, overlapping in the seams between the upper insulation blocks and the support plates, to ensure continuity in the annular direction. It is important that the plywood plates are not mounted butt-to-butt in the type of structure in question here; the width of the plates has to be somewhat narrower than the width of the insulation members, to avoid buckling.

The embodiment in FIG. 4 is a variation of the embodiment in FIG. 1, whereby the glue seam between the two insulations may be omitted. In FIG. 4, a mechanical rigid plate 37 has been molded onto the upper tank insulation panel 36, with reinforcement 38 embedded inside the insulation. The rigid plate member 37 may be, e.g., glass fiber-reinforced plastic. Between the skirt insulation 7 and the insulation member 36, i.e., the outside plate member 37 which has been molded onto the insulation 36, a layer of soft insulation material 39, for example rockwool, is placed. Above this, on the inside wall of the skirt, i.e., against a plywood plate 9 which is mounted on the inside wall of the skirt insulation 7, a fastening board 40 is mounted by means of bolts 41. The fastening board 40 is mounted at an angle such that a wedge-shaped space is formed for receiving the plate 37, as may be seen in FIG. 4. At the bottom, a fastening board 44 is similarly mounted by means of bolts 42. Within the wedge-shaped space formed by the fastening board 44, a narrower member 43 is placed which forms a support for the plate 37.

The embodiment shown in FIG. 4 constitutes a variation of the foregoing embodiment because the glue bond is in this case omitted, but this solution could also be adapted to include a glue bond, corresponding to the adhesive bond in the embodiment of FIG. 1.

The above-described embodiments are typical examples of ways by which the joint between two layers of insulation in a wedge-shaped region may be improved and secured by strengthening the joint mechanically. Thus, with such embodiments one obtains the expressed object of the invention.

Having described my invention, I claim:

1. An insulated spherical tank system for containing liquefied gas comprising, a spherical tank for containing liquefied gas, an annular support ring for the tank joined to the periphery of the tank at a point of juncture for supporting the tank on a support structure, said support ring having an inner surface facing the tank, and said tank having an outer surface facing the inner surface of the ring, said tank and ring defining a generally wedge shaped space therebetween below said point of juncture thereof, a first insulation layer secured to said inner surface of said ring and a second insulation layer surrounding and adjacent to said outer surface of the tank, said first and second insulation layers extending into said wedge shaped space, and nonadhesive mechanical means for joining said insulation layers together in said wedge shaped space; said nonadhesive mechanical joining means including means secured to said ring and defining a generally wedge shaped receiving pocket opening outwardly away from said point of juncture between the ring and tank, said second insulation layer having an upper and received in said pocket, said means defining said generally wedged shaped pocket including means for mechanically clamping said upper end of the second insulation layer in said pocket.

2. An insulated spherical tank system as defined in claim 1 wherein said clamping means comprises a plate mounted on said ring and spaced inwardly therefrom toward said tank.

3. An insulated spherical tank system as defined in claim 2 wherein said joining means includes an insulation block mounted on said ring between said first insulation layer and said plate and defining a bottom wall for said receiving pocket.

4. An insulated spherical tank system for containing liquefied gas comprising, a spherical tank for containing liquefied gas, an annular support ring for the tank joined to the periphery of the tank at a point of juncture for supporting the tank on a support structure, said support ring having an inner surface facing the tank, and said tank having an outer surface facing the inner surface of the ring, said tank and ring defining a generally wedge shaped space therebetween below said point of juncture thereof, a first insulation layer secured to said inner surface of said ring and a second insulation layer surrounding and adjacent to said outer surface of the tank, said first and second insulation layers extending into said wedge shaped space, and nonadhesive mechanical means for joining said insultation layers together in said wedge shaped space; said second insulating layer having an upper end in said wedge shaped space, said upper end including a rigid plate extending outwardly beyond the second insulation layer and said joining means comprising clamping means mounted on said ring for clampingly engaging said rigid plate and joining said second layer to said first layer.

5. An insulated spherical tank system as defined in claim 4 including a layer of elastic insulating material betwen said plate and said first insulation layer.

6. An insulated spherical tank system for containing liquified gas comprising, a spherical tank for containing liquefied gas, an annular support ring for the tank joined to the periphery of the tank at a point of juncture for supporting the tank on a support structure, said support ring having an inner surface facing the tank and including a first layer of insulation thereon and said tank having an outer surface facing the inner surface of the ring and having a second layer of insulation thereon, said second layer of insulation having an upper end, said ring and tank defining a wedge shaped space therebetween beneath said point of juncture; and means for forming a non-adhesive mechanical joint between the upper end of said second insulation layer and said first insulation layer in said wedge shaped space including means mounted on said ring defining a receiving pocket which opens away from said point of juncture and receives therein said upper end of the second insulation layer; said means defining the receiving pocket including a plate, an insulation block positioned between the plate and said first layer of insulation defining a bottom for the pocket, and means on said ring for drawing said plate toward the ring against said upper end of the second insulation layer to clamp said second layer against said first layer.

7. An insulated spherical tank system for containing liquefied gas comprising a spherical tank for containing liquefied gas, an annular support ring for the tank joined to the periphery of the tank at a point of juncture for supporting the tank on a support structure, said support ring having an inner surface facing the tank and including a first layer of insulation thereon and said tank having an outer surface facing the inner surface of the ring and having a second layer of insulation thereon, said second layer of insulation having an upper end including a rigid plate having edge portions which extend outwardly beyond the insulation; said ring and tank defining a wedge shaped space therebetween beneath said point of juncture; and means mounted on said ring for clampingly engaging said edge portions of the rigid plate on said second insulation layer to form a nonadhesive mechanical joint between the upper end of said second insulation layer and said first insulation layer in the wedge shaped space between the ring and tank.

8. An insulated spherical tank system as defined in claim 7 including a layer of elastic insulation material positioned between said rigid plate and said first layer of insulation on the ring.

* * * * *